United States Patent
Amemura

(10) Patent No.: US 9,769,342 B2
(45) Date of Patent: Sep. 19, 2017

(54) ELECTRIC APPARATUS

(71) Applicant: SHARP KABUSHIKI KAISHA, Osaka-shi, Osaka (JP)

(72) Inventor: Tatsuaki Amemura, Osaka (JP)

(73) Assignee: Sharp Kabushiki Kaisha, Osaka (JP)

(*) Notice: Subject to any disclaimer, the term of this patent is extended or adjusted under 35 U.S.C. 154(b) by 0 days.

(21) Appl. No.: 14/389,593

(22) PCT Filed: Apr. 17, 2013

(86) PCT No.: PCT/JP2013/061358
§ 371 (c)(1),
(2) Date: Sep. 30, 2014

(87) PCT Pub. No.: WO2013/157566
PCT Pub. Date: Oct. 24, 2013

(65) Prior Publication Data
US 2015/0334651 A1    Nov. 19, 2015

(30) Foreign Application Priority Data
Apr. 20, 2012  (JP) .................. 2012-097017

(51) Int. Cl.
*H04W 52/02*       (2009.01)
*H04N 1/00*         (2006.01)
(Continued)

(52) U.S. Cl.
CPC ....... *H04N 1/00891* (2013.01); *G06F 1/3206* (2013.01); *H04N 1/00408* (2013.01);
(Continued)

(58) Field of Classification Search
CPC .................. H04W 52/0209; H04W 88/02
(Continued)

(56) References Cited

U.S. PATENT DOCUMENTS 5,570,028 A   10/1996  Sperlazzo et al.
5,977,976 A   11/1999  Maeda
(Continued)

FOREIGN PATENT DOCUMENTS

CN       102075651 A      5/2011
JP       8-294024 A      11/1996
(Continued)

*Primary Examiner* — Chi H Pham
*Assistant Examiner* — Robert Lopata
(74) *Attorney, Agent, or Firm* — Birch, Stewart, Kolasch & Birch, LLP

(57) ABSTRACT

Provided is an electric apparatus including a reception unit (for example, hardware key) for receiving an instruction relating to functions of the electric apparatus and having operation states of a power conserving state in which power required for performing the functions thereof is limited and a normal state in which the power is not limited, wherein the reception unit may receive an instruction indicating a return to the normal state in the power conserving state and receive an instruction which is to be originally received in the normal state. When the reception unit receives the instruction, signals at different levels are output depending on the operation state and based on the signal to be output, a return signal relating to the return to the normal state or an execution signal relating to the execution of a function corresponding to the instruction received by the receiving signal is output.

3 Claims, 4 Drawing Sheets

(51) Int. Cl.
  *G06F 1/32* (2006.01)
  *H04W 88/02* (2009.01)
  *B41J 29/393* (2006.01)

(52) U.S. Cl.
  CPC .... *H04N 1/00896* (2013.01); *H04W 52/0209* (2013.01); *B41J 2029/3932* (2013.01); *H04N 2201/0094* (2013.01); *H04W 88/02* (2013.01); *Y02B 60/50* (2013.01)

(58) Field of Classification Search
  USPC ........................................................ 370/311
  See application file for complete search history.

(56) References Cited

U.S. PATENT DOCUMENTS

| | | | |
|---|---|---|---|
| 6,193,422 B1 | 2/2001 | Belt et al. | |
| 6,292,181 B1* | 9/2001 | Banerjee | H04L 29/12009 345/179 |
| 6,445,383 B1 | 9/2002 | Chambers et al. | |
| 7,716,506 B1* | 5/2010 | Surgutchik | G06F 1/3203 713/321 |
| 2004/0103330 A1* | 5/2004 | Bonnett | G06F 1/3203 713/322 |
| 2004/0203389 A1* | 10/2004 | Kojima | H04M 1/7253 455/41.2 |
| 2007/0206211 A1 | 9/2007 | Okutsu et al. | |
| 2008/0065917 A1* | 3/2008 | Suzukawa | G06F 1/26 713/323 |
| 2008/0133826 A1* | 6/2008 | Shimizu | G06F 9/4403 711/105 |
| 2008/0207188 A1* | 8/2008 | Ahn | G06F 3/04847 455/418 |
| 2009/0061781 A1* | 3/2009 | Zhang | H04W 52/0258 455/66.1 |
| 2010/0100716 A1 | 4/2010 | Scott et al. | |
| 2010/0102832 A1 | 4/2010 | Bartling et al. | |
| 2011/0043275 A1* | 2/2011 | Fuks | G06F 1/3203 327/524 |
| 2011/0126036 A1 | 5/2011 | Hayakawa | |
| 2011/0273546 A1* | 11/2011 | Lin | G06K 9/00771 348/61 |
| 2012/0042184 A1* | 2/2012 | Yeh | G06F 1/3203 713/323 |
| 2012/0117401 A1* | 5/2012 | Gobriel | H04W 52/0209 713/320 |
| 2012/0166842 A1* | 6/2012 | Sur | G06F 1/206 713/323 |
| 2012/0223671 A1* | 9/2012 | Seethaler | G06F 21/44 320/106 |
| 2013/0117489 A1* | 5/2013 | Doshi | G06F 13/385 710/313 |
| 2013/0305074 A1* | 11/2013 | Ellis | G11C 7/02 713/324 |
| 2014/0032955 A1* | 1/2014 | Boelter | H04L 47/32 713/323 |
| 2014/0189198 A1* | 7/2014 | Siddiqi | G06F 12/0246 711/103 |
| 2015/0282096 A1* | 10/2015 | Senarath | H04W 52/146 455/522 |
| 2015/0304768 A1* | 10/2015 | Prakash | G06F 1/3209 381/59 |

FOREIGN PATENT DOCUMENTS

| | | |
|---|---|---|
| JP | 8-307504 A | 11/1996 |
| JP | 2006-146593 A | 6/2006 |
| JP | 2007-194876 A | 8/2007 |
| JP | 2010-282253 A | 12/2010 |
| JP | 2011-175366 A | 9/2011 |

* cited by examiner

ELECTRIC APPARATUS

This non-provisional application is a National Stage entry under U.S.C. § 371 of International Application No. PCT/JP2013/061358 filed on Apr. 17, 2013, which claims priority to Japanese Patent Application No. 2012-097017 filed in Japan on Apr. 20, 2012. The entire contents of all of the above applications are hereby incorporated by reference.

BACKGROUND

1. Technical Field

The present invention relates to an electric apparatus which includes a reception unit for receiving an instruction relating to functions of the electric apparatus, and has operation states of a power conserving state in which power required for performing the functions thereof is limited and a normal state in which the power is not limited.

2. Description of Related Art

Recently, with technological development, electric apparatuses have come to include many functions and thus the high-functionality thereof has been increased. However, with the progress of this high-functionality, there is a problem in operability, and therefore various researches have been conducted to improve the operability of electric apparatus having a plurality of functions.

For example, Japanese Patent Laid-open Publication No. 8-294024 discloses an electric apparatus which is capable of selectively operating a plurality of functions using a single change-over switch by sequentially displaying receiving screens corresponding to each function for receiving instructions relating to the plurality of functions every time a prescribed time elapses, when the change-over switch is continuously pressed.

Further, Japanese Patent Laid-open Publication No. 8-307504 discloses an electric apparatus including a detecting means for detecting, when a prescribed number of switching means among the plurality of switching means are combined and operated, the combination operation of the prescribed number of switching means and a control means for changing the priority of functions to a predefined order corresponding to the detected result. Thereby, the electric apparatus having the above-described configuration is capable of allowing an operator to easily change the priority of functions.

SUMMARY

Meanwhile, many electric apparatuses are provided with, on outside thereof, hardware keys relating to functions of the electric apparatuses.

For example, many electric apparatuses such as a mobile phone, an MFP, or the like in addition to a tablet are provided with home keys for shifting a display screen of a display unit to a home screen (or an initial screen) which receives a selection of any one of functions of the electric apparatuses.

Since the number of layers selected to progress services is remarkably increased with the development of a user interface (UI), the home key is provided to promote improvement in usability.

However, the home key has a structure in which, when being operated by a user, the operation is detected and then the corresponding processing (shifting to the home screen) is performed. Therefore, in order to accurately carry out the function of the home key, it is necessary to define the condition that the home key is operated by the user during OS start-up.

That is, when the OS is in a sleep state such as a so-called power conserving mode or is in a shut down state (hereinafter, referred to as an OFF mode), the function of the home key is not carried out and the usability thereof is insufficient.

Further, generally, in order to return the electric apparatus from the power conserving mode or the OFF mode, the electric apparatus includes a separate hardware key. As a result, the number of hardware keys is increased, thereby increasing costs and degrading user operability.

However, the electric apparatuses disclosed in Japanese Patent Laid-open Publication No. 8-294024 and Japanese Patent Laid-open Publication No. 8-307504 do not consider the above problems and may not solve these problems.

In consideration of the above-mentioned circumstances, it is an object of the present invention to provide an electric apparatus including a reception unit configured to receive an instruction relating to functions of the electric apparatus and having operation states of a power conserving state in which power required for performing the functions thereof is limited and a normal state in which the power is not limited, wherein the electric apparatus is configured to output different levels of signals depending on an operation state when the reception unit receives the instruction, and output a return signal relating to a return to the normal state or an execution signal relating to an execution of a function corresponding to the instruction received by the reception unit, based on the signal to be output, thereby being capable of receiving the instruction indicating the return to the normal state in the power conserving state, and allowing the reception unit to receive the instruction which is to be originally received in the normal state through the reception unit (for example, hardware key).

According to the present invention, there is provided an electric apparatus including a reception unit configured to receive an instruction relating to functions of the electric apparatus and having operation states of a power conserving state in which power required for performing the functions thereof is limited and a normal state in which the power is not limited, the electric apparatus including: a signal output unit configured to output a signal at a level depending on the operation state when the reception unit receives the instruction; and a control signal unit configured to output a return signal relating to a return to the normal state or an execution signal relating to an execution of a function corresponding to the instruction received by the reception unit, based on the signal output from the signal output unit.

According to the present invention, for example, when the user performs the operation for pushing the reception unit (for example, hardware key) and the reception unit receives the instruction, the signal output unit outputs a signal at a high level or a low level depending on the current operation state. The control signal unit outputs the return signal to a power supply circuit or outputs the execution signal to a driving unit relating to the execution of the function, based on whether the signal output from the signal output unit is the signal at the high level or the signal at the low level.

In the electric apparatus according to the present invention, the signal output unit may have two terminals configured to output signals to the control signal unit and the control signal unit may output the return signal or the execution signal, based on a signal level relating to any one of the two terminals which are defined by the operation state.

According to the present invention, for example, when the reception unit receives the instruction and the signal output unit outputs the signal at the high level or the low level, the control signal unit outputs the return signal or the execution signal, based on the signal level input to any one terminal of the two terminals which is defined by the operation state.

In the electric apparatus according to the present invention, the control signal unit may include: a return signal unit which has two input terminals corresponding to the terminals of the signal output unit, and is configured to output the return signal; and an execution signal unit configured to output the execution signal, wherein the return signal unit may output the return signal based on the signal level of one input terminal of the two input terminals, and the execution signal unit may output the execution signal based on the signal level of the other input terminal.

According to the present invention, depending on the current operation state, the execution signal unit outputs the return signal based on the signal level of one input terminal of the two input terminals, and the execution signal unit outputs the execution signal based on the signal level of the other input terminal.

According to the present invention, in the power conserving state, the electric apparatus may receive the instruction indicating a return to the normal state through the reception unit, while in the normal state, the reception unit may receive the instruction which is to be originally received, thereby effectively using the reception unit. Further, there is no need to separately include a hardware key for returning from the power conserving state to the normal state. Therefore, the number of hardware keys may be reduced in the electric apparatus, and thereby it is possible to reduce costs and improve user operability.

The above and further objects and features will move fully be apparent from the following detailed description with accompanying drawings.

DETAILED DESCRIPTION

Hereinafter, a case in which an electric apparatus according to an embodiment of the present invention is applied to a multi-function peripheral will be described in detail, by way of example, with reference to the accompanying drawings. The multi-function peripheral has a function of a scanner, a facsimile, a printer and the like.

The multi-function peripheral according to the embodiment of the present invention has operation modes (operation states) of a power conserving mode (power conserving state) and a standby mode (normal state). In the power conserving mode, a supply of power to parts relating to the execution of functions of the multi-function peripheral is limited and thus power consumption is reduced. Further, in the standby mode, power is supplied to the parts in which the supply of power was limited, such that prescribed functions may be immediately performed according to an instruction from a user.

Figure 1:
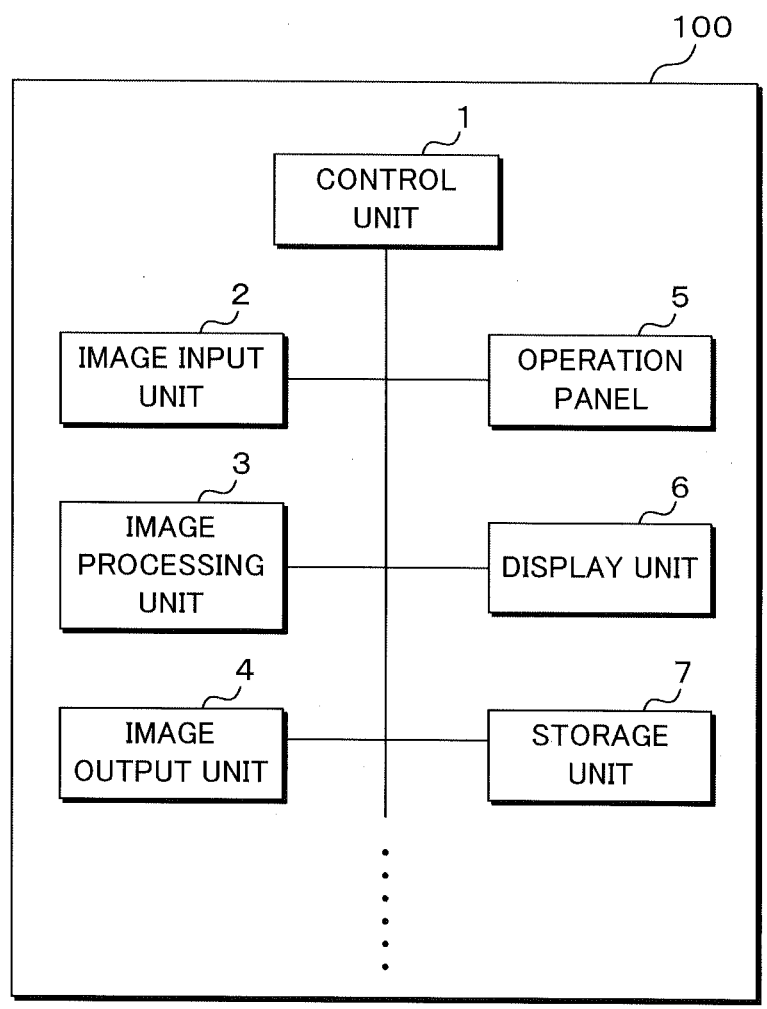
FIG. 1 is a functional block diagram illustrating a configuration of main components of a multi-function peripheral according to an embodiment of the present invention.

FIG. 1 is a functional block diagram illustrating a configuration of main components of a multi-function peripheral 100 according to an embodiment of the present invention. The multi-function peripheral 100 includes a control unit 1, an image input unit 2, an image processing unit 3, an image output unit 4, an operation panel 5, a display unit 6, a storage unit 7 and the like.

The image input unit 2 includes a light source irradiating light to a manuscript for reading, an image sensor such as a charge coupled device (CCD), or the like, and optically reads image data of the manuscript. Further, the image input unit 2 forms an image reflected from the manuscript set at a prescribed read position on the image sensor to output analog data of red-green-blue (RGB).

The image processing unit 3 generates, for example, digital type image data based on the analog data input from the image input unit 2 or reads the image data stored in the storage unit 7, performs processing depending on each form of images, and then generates image data to be output (printed). The image data for outputting generated by the image processing unit 3 is output to the image output unit 4.

The image output unit 4 prints an image on a recording medium such as recording paper, an OHP film, or the like based on the image data output from the image processing unit 3. The image output unit 4 includes a photosensitive drum, a charger for charging the photosensitive drum to a prescribed potential, a laser writing device which emits a laser beam depending on the image data received from an outside to generate an electrostatic latent image on the photosensitive drum, a developing device which supplies a toner to the electrostatic latent image formed on a surface of the photosensitive drum to develop the image, a transfer unit which transfers a toner image formed on the surface of the photosensitive drum onto the recording medium, and forms the image on the recording medium by an electro-photographic method.

Further, in the multi-function peripheral 100, the operation panel 5 is provided with hardware keys, such as a function key for switching functions such as "facsimile", "copy", "printing", "mail", and the like, a start key, a cancel key, an enter key for fixing a received instruction, and a home key for returning a display screen of the display unit 6 to a home screen receiving a selection of any one of functions of the multifunction peripheral 100.

The display unit 6 includes, for example, an LCD, an electroluminescence (EL) panel, or the like and displays an image to be output (printed) on a prescribed recording paper through the image output unit 4. Further, the display unit 6 displays information to be notified to the user, such as a state of the multi-function peripheral 100, a job processing situation, an image of a manuscript read by the image input unit 2, and a confirmation of an operation content of the operation panel 5 and the like.

The storage unit 7 includes, for example, a non-volatile storage medium such as a flash memory, an EEPROM, an HDD, a magneto-resistive memory (MRAM), a ferroelectric RAM (FeRAM), an OUM or the like.

Figure 2:
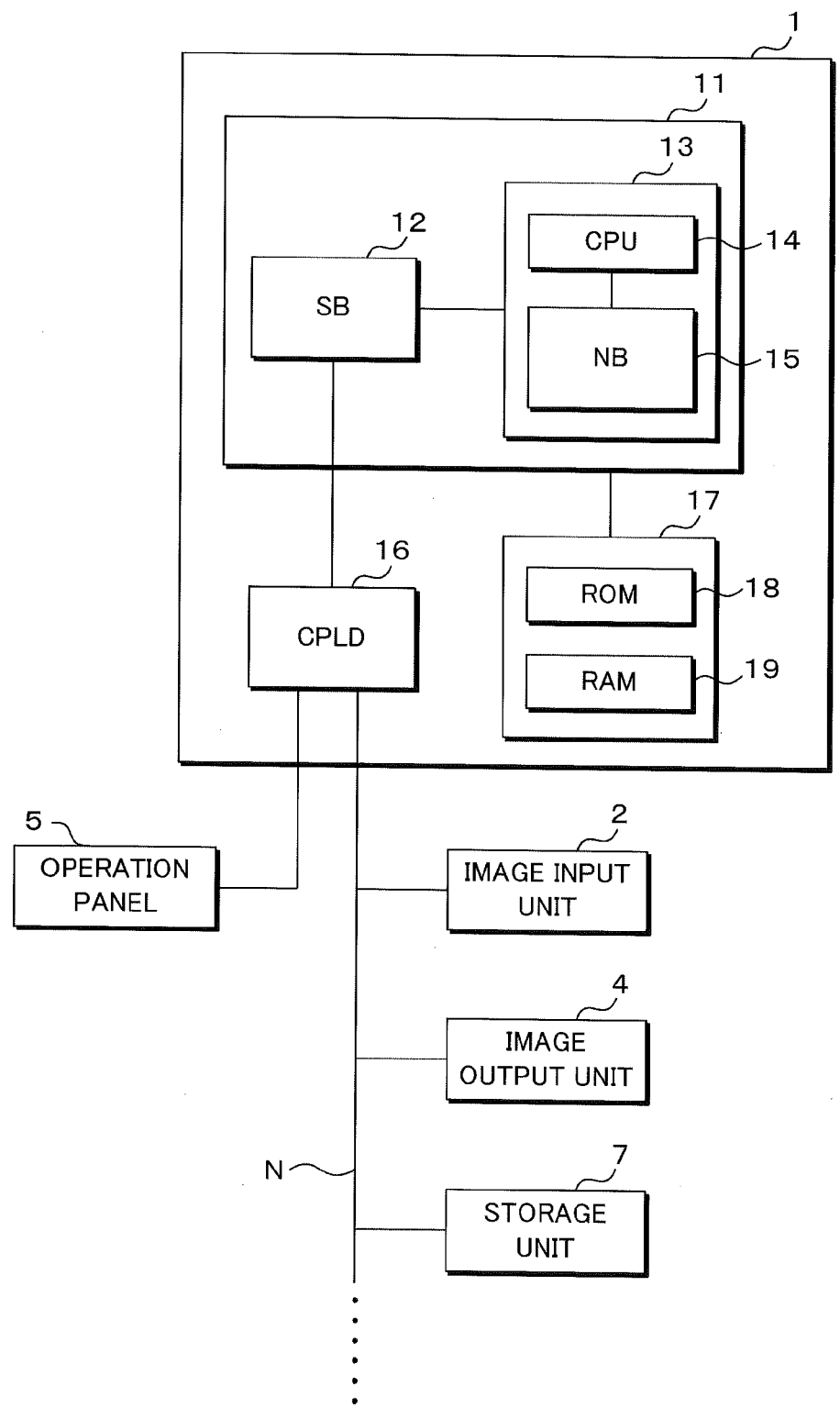
FIG. 2 is a functional block diagram illustrating a configuration of main components of a control unit in the multi-function peripheral according to the embodiment of the present invention.

FIG. 2 is a functional block diagram illustrating a configuration of main components of the control unit 1 in the multi-function peripheral 100 according to the embodiment of the present invention.

The control unit 1 includes an instruction control unit 11, a complex programmable logic device (CPLD) 16, and a system memory 17. The instruction control unit 11 has a system on chip (SOC) 13 in which a south bridge (SB) 12, a CPU 14, and a north bridge (NB) 15 are integrated as a single chip. Further, the system memory 17 includes a ROM 18 and a RAM 19.

The instruction control unit 11, the CPLD 16, and the SOC 13 play a role of the control signal unit, the signal output unit, and the execution signal unit described in the claims, respectively.

Figure 3:
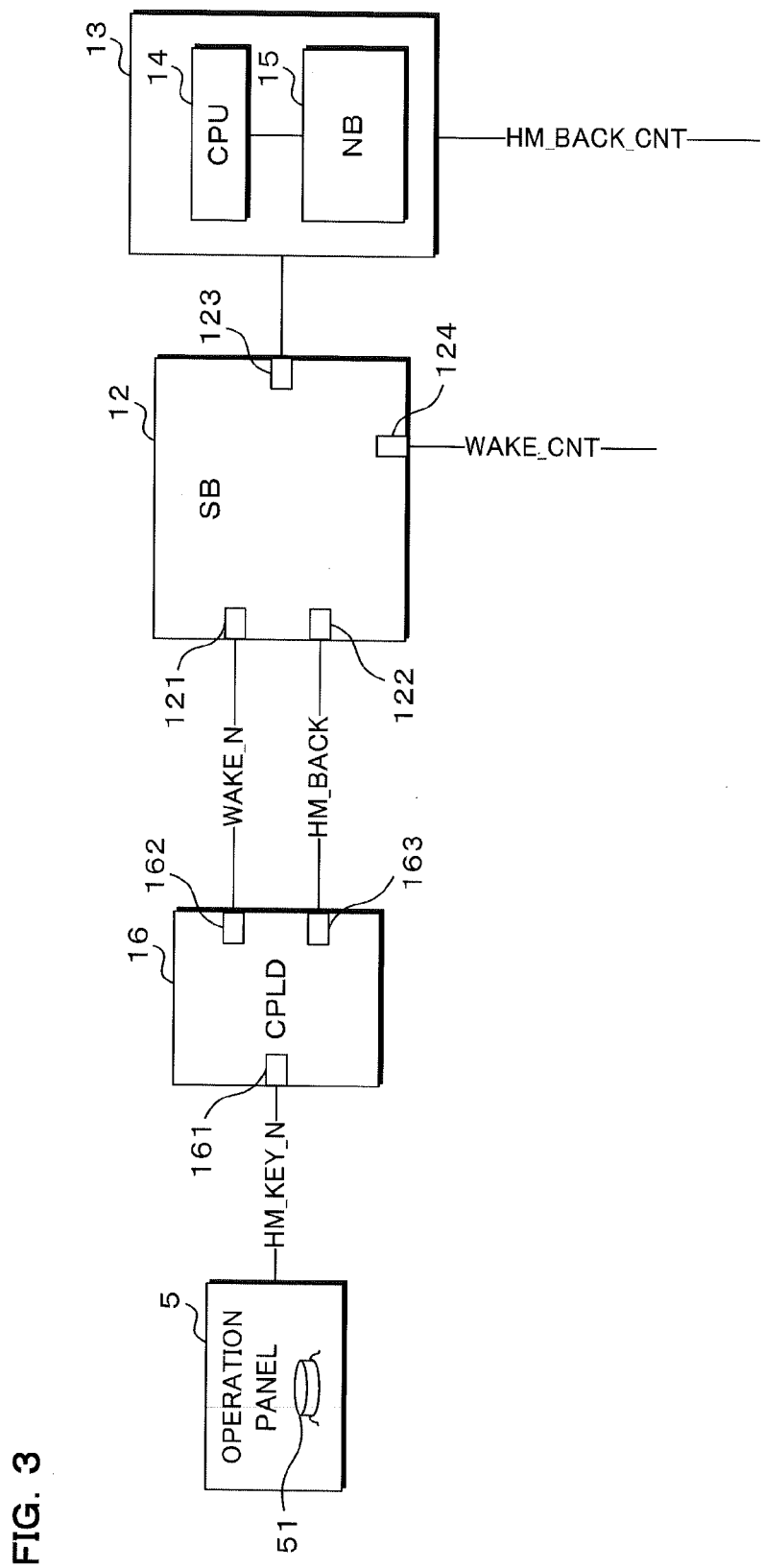
FIG. 3 is an explanatory diagram describing a connection relation between a CPLD, a south bridge, and an SOC in the multi-function peripheral according to the embodiment of the present invention.

FIG. 3 is an explanatory diagram describing a connection relation between the CPLD 16, the south bridge 12, and the SOC 13 in the multi-function peripheral 100 according to the embodiment of the present invention.

The CPLD 16 is a programmable logic unit which is an electrical circuit having a structure capable of being modified by programming and is connected to the image input unit 2, the image output unit 4, the storage unit 7, the operation panel 5 and the like. The CPLD 16 is equipped with wirings connected to these circuits and is connected thereto through a PCI bus N.

The CPLD 16, in particular, allows the control unit 1 to perform a sequence control. For example, the CPLD 16 controls mode shifting based on the prescribed signal from the south bridge 12 and performs a change in a connection destination of a signal, a signal output, and the like in accordance with each mode.

In detail, the CPLD 16 includes an input terminal 161 for receiving a signal output from the operation panel 5 and output terminals 162 and 163 for outputting a signal to the south bridge 12. When a prescribed signal is input from the operation panel 5 through the input terminal 161, the CPLD 16 outputs signals at different levels to the south bridge 12 through the output terminals 162 and 163 based on whether a current operation mode is the standby mode or the power conserving mode.

The south bridge 12 plays a role of a so-called "chip set" for controlling a flow of signals within the control unit 1. Further, the south bridge 12 serves to connect the PCI bus N with an ISA bus.

The south bridge 12 (return signal unit), in particular, outputs a signal which is to be a trigger of the mode shifting. For example, the south bridge 12 outputs a "WAKE_CNT" signal which is a trigger signal in the return from the power conserving mode to the standby mode.

Specifically, the south bridge 12 has an input terminal 121 and an input terminal 122 each corresponding to the output terminal 162 and the output terminal 163 of the CPLD 16, and has an output terminal 123 for outputting a signal to the SOC 13 and an output terminal 124 for outputting a signal to a power supply circuit (for example, DCDC) of hardware relating to each above-described function. The "WAKE_CNT" signal is output to the power supply circuit through the output terminal 124.

The north bridge 15 has a function as a memory controller and a graphic processing unit (GPU) and similar to the south bridge 12, plays a role of a so-called "chip set" for controlling the flow of signals within the control unit 1. Further, the north bridge 15 serves to connect the CPU 14 with the PCI bus N.

The ROM 18 is basically pre-stored with various control programs, fixed data among parameters for operation, and the like, and the RAM 19 temporarily stores data and reads the data independent of a storage order, a storage position or the like. Further, the RAM 19 stores, for example, programs read from the ROM 18, various data generated by running the programs, parameters appropriately changed at the time of running and the like.

The CPU 14 loads and runs a control program pre-stored in the ROM 18 onto the RAM 19 to control various types of the above-described hardware and operates the overall apparatus as the multi-function peripheral 100 according to the present invention.

Further, the CPU 14 detects the signal input to SOC13 through the output terminal 123 of the south bridge 12, and outputs an instruction signal "HM_BACK_CNT" to the display unit 6 (OS) to return the display screen of the display unit 6 to the home screen through the north bridge 15 based on the detected result.

In the multi-function peripheral 100 having the above-described configuration according to the embodiment of the present invention, when any one of the hardware keys provided in the operation panel 5 is operated by the user, the operated hardware key receives the operation as other instructions depending on the current operation mode.

In other words, the multi-function peripheral 100 according to the embodiment of the present invention is configured to allow the hardware key of the operation panel 5 to perform other functions depending on the operation mode. Hereinafter, the home key 51 will be described as an example of the hardware key with reference to FIG. 3.

Before the user performs an operation for pushing the home key 51, the home key 51 outputs a "HM_KEY=1" signal. Meanwhile, when the user performs an operation for pushing the home key 51, a "HM_KEY=0" signal is output (wherein 1=H/0=L). In this case, a "0" signal is input to the input terminal 161 of the CPLD 16.

When the "HM_KEY=0" signal is input, that is, when the home key 51 is operated by the user, the CPLD 16 outputs different levels of signals to the south bridge 12 based on whether the current operation mode is the standby mode or the power conserving mode. Hereinafter, based on the standby mode and the power conserving mode it will be described separately.

<Standby Mode>

When the "HM_KEY=0" signal is input, the CPLD 16 outputs signals of "WAKE_N=Z" and "HM_BACK=1" to the south bridge 12 through the output terminals 162 and 163, respectively, at the time when the multi-function peripheral 100 is currently in the standby mode" (Z is high impedance).

Next, the signals of the "WAKE_N=Z" and "HM_BACK=1" from the CPLD 16 are input to the input terminals 121 and 122 of the south bridge 12, respectively.

In this case, the CPU 14 monitors the input terminal 122 of the south bridge 12 through the north bridge 15. Meanwhile, when the CPU 14 detects the input of the "HM_BACK=1" signal to the input terminal 122, issues an instruction to output the "HM_BACK_CNT" signal and return the display screen of the display unit 6 to the home screen. Then, the display screen of the display unit 6 is shifted to become the home screen.

<Power Conserving Mode>

Meanwhile, when the "HM_KEY=0" signal is input, the CPLD 16 outputs signals of "WAKE_N=0" and "HM_BACK=0" to the south bridge 12 through the output terminals 162 and 163, respectively, at the time when the multi-function peripheral 100 is currently in the power conserving mode".

Next, the signals of the "WAKE_N=0" and "HM_BACK=0" from the CPLD 16 are input to the input terminals 121 and 122 of the south bridge 12, respectively.

As described above, when the "WAKE_N=0" signal is input to the input terminal 121, the south bridge 12 outputs the "WAKE_CNT" signal through the output terminal 124.

For example, the "WAKE_CNT" signal is output to the CPLD 16. When the "WAKE_CNT" signal is input, the CPLD 16 outputs a signal indicating a instruction to power on the power supply circuit of the hardware relating to each function as described above.

Meanwhile, the user holds the home key 51 down, and therefore the time from when the "HM_KEY=0" signal is informed to the south bridge 12 until the "WAKE_CNT" signal is output is several μs, and a speed at which the user may subsequently hold the home key 51 down is about several 10 ms. Therefore, there is no risk of a malfunction due to a subsequent pushing of the home key 51 by a user.

As described above, in the multi-function peripheral 100 according to the embodiment of the present invention, the hardware key of the operation panel 5 receives the instruction to be originally received in the standby mode and receives the instruction to return from the power conserving mode to the standby mode in the power conserving mode. Therefore, there is no need to separately provide the hardware key for receiving the instruction indicating a return to the standby mode.

Figure 4:
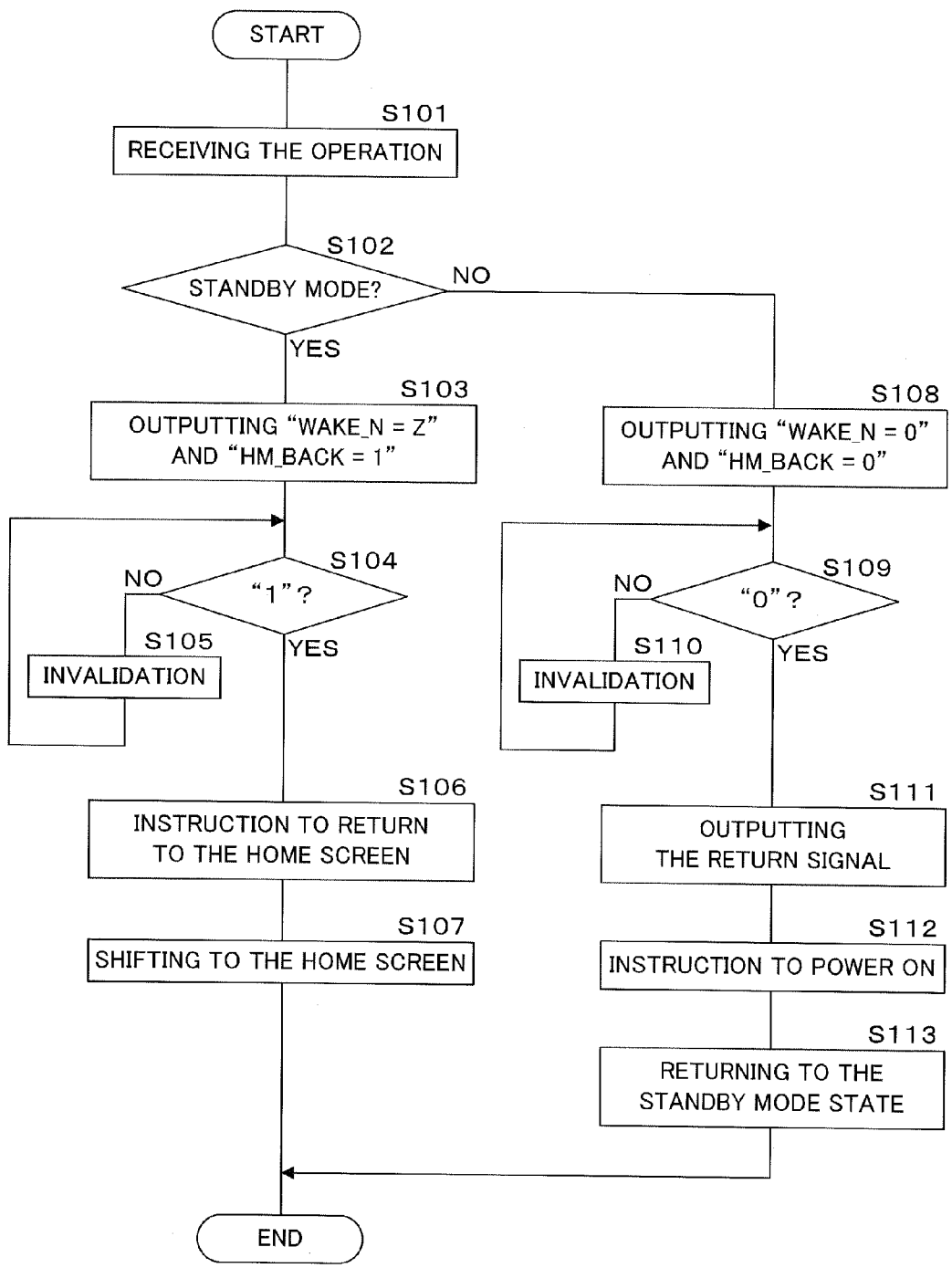
FIG. 4 is a flow chart describing an instruction reception of a home key in the multi-function peripheral according to the embodiment of the present invention.

FIG. 4 is a flow chart describing the instruction reception of the home key 51 in the multi-function peripheral 100 according to the embodiment of the present invention.

When the user performs an operation for pushing the home key 51, the home key 51 receives the operation (step S101) and the "HM_KEY=0" signal is output (wherein 1=H/0=L).

Thereby, when the "0" signal is input to the input terminal 161 of the CPLD 16, and the multi-function peripheral 100 is currently in the standby mode (YES in step S102), the CPLD 16 outputs the signals of the "WAKE_N=Z" and "HM_BACK=1" to the south bridge 12 through the output terminals 162 and 163, respectively (step S103). The signals of the "WAKE_N=Z" and "HM_BACK=1" from the CPLD 16 are input to the input terminals 121 and 122 of the south bridge 12, respectively.

During monitoring the input terminal 122 of the south bridge 12, when the CPU 14 detects the input of the "HM_BACK=0" signal (NO in step S104), the CPU 14 processes the signal as an invalidation (step S105) and returns the processing to S104 again.

Meanwhile, during monitoring the input terminal 122 of the south bridge 12, when the CPU 14 detects the input of the "HM_BACK=1" signal (YES in step S104), the CPU 14 issues an instruction to output the "HM_BACK_CNT" signal to the OS and return the display screen of the display unit 6 to the home screen (step S106).

Depending on the instruction from the CPU 14, the OS shifts the display screen which is being displayed on the display unit 6 to the home screen (step S107).

Meanwhile, when the multi-function peripheral 100 is in the power conserving mode (NO in step S102) at the time when a "0" signal is input to the input terminal 161 of the CPLD 16, the CPLD 16 outputs the signals of the "WAKE_N=0" and "HM_BACK=0" to the south bridge 12 through the output terminals 162 and 163, respectively (step S108). The signals of the "WAKE_N=0" and "HM_BACK=0" from the CPLD 16 are input to the input terminals 121 and 122 of the south bridge 12, respectively.

In this case, the CPU14 monitors the signal input to the input terminal 121. For example, when the "WAKE_N=1" signal is input to the input terminal 121 (NO in step S109), the CPU14 processes the signal as an invalidation (step S110) and returns the processing to step S109 again.

Meanwhile, when the "WAKE_N=0" signal is input to the input terminal 121 (YES in step S109), the south bridge 12 outputs the "WAKE_CNT" signal which is the return signal indicating the return from the power conserving mode to the standby mode through the output terminal 124 (step S111).

The "WAKE_CNT" signal is output to the CPLD 16, and as described above, the CPLD 16 outputs the signal indicating the instruction to power on the power supply circuit of the hardware relating to each function (step S112).

Next, the processing is performed similar to the initial starting, and thus operation mode returns to the standby mode state prior to being shifted to the power conserving mode (step S113).

As described above, although the home key 51 as the hardware key of the operation panel 5 is described by way of example, the present invention is not limited thereto, and therefore any one of the hardware keys such as a numeric pad, a start key, a stop key, and the like may be used.

As this invention may be embodied in several forms without departing from the spirit of essential characteristics thereof, the present embodiments are therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

The invention claimed is:

1. An electric equipment including a reception unit configured to receive an instruction relating to functions of the electric equipment by an operation of a user and having operation states of a power conserving state in which power required for performing the functions thereof is limited and a normal state in which the power is not limited, the electric equipment comprising:
    a signal output unit configured to output signals of different levels depending on the operation state when the reception unit receives the instruction from the user; and
    a control signal unit configured to selectively output a return signal relating to a return to the normal state or an execution signal relating to an execution of a function corresponding to the instruction received by the reception unit, based on the signal output from the signal output unit.

2. The electric equipment according to claim 1, wherein the signal output unit has two terminals configured to output signals to the control signal unit, and
    the control signal unit outputs the return signal or the execution signal, based on a signal level relating to any one of the two terminals which are defined by the operation state.

3. The electric equipment according to claim 1, wherein the control signal unit includes:
    a return signal unit which has two input terminals corresponding to the terminals of the signal output unit, and is configured to output the return signal; and
    an execution signal unit configured to output the execution signal,
        wherein the return signal unit outputs the return signal based on the signal level of one input terminal of the two input terminals, and the execution signal unit outputs the execution signal based on the signal level of the other input terminal.

* * * * *